US00RE41775E

(19) United States
(12) Reissued Patent
Nielsen et al.

(10) Patent Number: US RE41,775 E
(45) Date of Reissued Patent: Sep. 28, 2010

(54) SYNCHRONIZED BINAURAL HEARING SYSTEM

(75) Inventors: Peter Ostergaard Nielsen, Ishoj (DK); John L Melanson, Austin, TX (US)

(73) Assignee: GN ReSound A/S (DK)

(21) Appl. No.: 11/345,693

(22) Filed: Feb. 1, 2006

Related U.S. Patent Documents

Reissue of:
(64) Patent No.: 6,839,447
Issued: Jan. 4, 2005
Appl. No.: 10/342,625
Filed: Jan. 14, 2003

U.S. Applications:

(63) Continuation of application No. PCT/DK01/00493, filed on Jul. 13, 2001.

(30) Foreign Application Priority Data

Jul. 14, 2000 (DK) ..... PA 2000 01094

(51) Int. Cl.
*H04R 25/00* (2006.01)

(52) U.S. Cl. ..... 381/312; 381/315
(58) Field of Classification Search ..... 381/23.1, 381/312, 314, 315, 316, 317, 320, 322, 92; 455/41.1, 41.2, 42, 73
See application file for complete search history.

(56) References Cited

U.S. PATENT DOCUMENTS 5,434,924 A * 7/1995 Jampolsky ..... 381/23.1
5,751,820 A * 5/1998 Taenzer ..... 381/312
5,991,419 A * 11/1999 Brander ..... 381/312
6,549,633 B1 * 4/2003 Westermann ..... 381/312

* cited by examiner

*Primary Examiner*—Huyen D Le
(74) *Attorney, Agent, or Firm*—Vista IP Law Group, LLP.

(57) ABSTRACT

A wireless binaural hearing aid system that utilises direct sequence spread spectrum technology to synchronize operation between individual hearing prostheses is provided.

13 Claims, 4 Drawing Sheets

SYNCHRONIZED BINAURAL HEARING SYSTEM

Matter enclosed in heavy brackets [ ] appears in the original patent but forms no part of this reissue specification; matter printed in italics indicates the additions made by reissue.

*RELATED APPLICATION DATA*

*This application is a re-issue application of U.S. patent application Ser. No. 10/342,625, issued as U.S. Pat. No. 6,839,447, which is a continuation of International Application No. PCT/DK01/00493 filed on Jul. 13, 2001, which claims priority to and the benefit of Danish Patent Application No. PA 2000 01094 filed on Jul. 14, 2000.*

FIELD OF THE INVENTION

The present invention relates to a binaural hearing system that comprises two fully or partly synchronously operating hearing prostheses capable of performing bi-directional data communication over a wireless communication channel. Fully synchronous operation between the hearing prostheses is preferably maintained by utilising direct sequence spread spectrum technology to lock all clock signals of a slave hearing prosthesis to a coding clock signal provided by a clock oscillator in the master hearing prosthesis during the bi-directional data communication. Thus, simultaneous sampling of respective microphone signals of the hearing prostheses is obtained so as to provide a wireless binaural hearing system that supports binaural signal processing techniques and algorithms.

BACKGROUND OF THE INVENTION

Hearing aid systems with bi-directional communication capability are well known in the art. U.S. Pat. No. 5,991,419 discloses a so-called bilateral hearing instrument that comprises two units for placement in a hearing aid user's left and right ears, respectively. Each instrument comprises an associated transceiver circuit so as to provide bi-directional wireless communication between the instruments. WO 99/43185 discloses a resembling binaural digital hearing aid system adapted to exchange raw or processed digital signals between two hearing aids to allow each aid to perform a processing of its own input signal as well as a simulated processing of the processing performed in the other aid, i.e. the hearing aid that is arranged on the user's reverse side. The simulated processing of reverse side signals is performed to provide a binaural signal processing technique that can restore binaural sound perception by taking into account differences in hearing loss and compensation between the user's two ears. U.S. Pat. No. 5,751,820 discloses an integrated circuit design for bi-directional communication utilising reflective communication technology to obtain low power consumption, thereby making the design suitable for battery operated personal communication systems, such as binaural digital hearing aid systems.

However, while it has been noted in the above-mentioned prior art that a practical binaural hearing aid system must have control of the synchronisation between the ear units, and that U.S. Pat. No. 5,991,419 states that the phase error between the units should correspond to time errors less than 10 μS, there has not been disclosed an adequate wireless synchronisation technology that would actually be capable of providing the required synchronisation between the units or aids.

To perform correct binaural processing of the respective signals of such binaural hearing aid systems it is mandatory to assure that the individual hearing aids or instruments are operating synchronously with respect to each other. In particular, the respective microphone signals must be sampled substantially synchronously to enable e.g. binaural beamforming and off-axis noise cancellation. Time shifts as small as 20–30 μS between sampling instants of the respective microphone signals in the two hearing aids may lead to a perceivable shift in the beam direction. Furthermore, a slowly time varying time shift between the sampling instants of the respective microphone signals, which inevitably will occur if the hearing aids are operated asynchronously, will result in an acoustic beam that appears to drift and focus in alternating directions. An undesirable effect, which certainly will be very annoying for the hearing aid user.

Consequently, in order to provide a practical binaural hearing system it is highly desirable to provide a wireless communication technique that assures synchronised operation between the individual hearing prostheses and which, at the same time, is practical for miniature and low-power battery operated equipment such as hearing prostheses.

DESCRIPTION OF THE INVENTION

A first aspect of the invention relates to a binaural hearing system comprising a first and a second hearing prosthesis adapted for wireless bi-directional communication of digital data signals; the first hearing prosthesis comprises a first microphone adapted to generate a first input signal in response to receiving acoustic signals,

- a first analogue-to-digital converter adapted to sample the first input signal by a first sampling clock signal to generate a first digital input signal,
- a first clock generator adapted to generate a coding clock signal, a data rate clock signal and the first sampling clock signal synchronously with respect to each other,
- a first sequence generator adapted to generate a repetitive coding sequence synchronously to the coding clock signal,
- first data generating means adapted to provide a first data signal synchronously to the data rate clock signal,
- a first wireless transceiver adapted to receive and modulate the first data signal with the repetitive coding sequence to transmit a first modulated data signal to a second wireless transceiver of the second hearing prosthesis and to retrieve a second data signal from a second modulated data signal received from the second wireless transceiver,
- first output means adapted to convert a first processed data signal to a first acoustical or electrical output signal.

The second hearing prosthesis comprises a second microphone adapted to generate a second input signal in response to receiving acoustic signals,

- a second analogue-to-digital converter adapted to sample the second input signal by a second sampling clock signal to generate a second digital input signal,
- a second sequence generator adapted to generate a version of the repetitive coding sequence of the first sequence generator synchronously to a second coding clock signal,
- second data generating means adapted to provide a second data signal synchronously to a retrieved clock signal,
- a second wireless transceiver adapted to receive the first modulated data signal from the first wireless transceiver and to modulate the second data signal with the version of the repetitive coding sequence to transmit a second modulated data signal to the first wireless transceiver, second clock and data retrieval means adapted to lock onto the first modulated data signal to retrieve the first data signal and to generate the second sampling clock signal and the retrieved clock signal, synchronously to the first coding clock signal, by correlating said first modulated data signal with the version of the repetitive coding sequence, second output means adapted to convert a second processed data signal to a first acoustical or electrical output signal. Thereby, the respective sampling clock signals of the hearing prostheses are synchronised in time so as to provide a hearing system with synchronous sampling of the respective microphone input signals.

According to the invention, the first clock generator operates as a master clock circuit for both hearing prostheses of the binaural hearing system during bi-directional communication of the first and second digital signals or data signals to ensure synchronous sampling of the respective microphone input signals. By locking the second clock and data retrieval means onto the received first modulated data signal, it is ensured that the retrieved clock signal and the second sampling clock signal in the second hearing prosthesis are synchronous to the coding clock signal generated by the first clock generator in the first hearing prosthesis. The microphone signal in the second hearing prosthesis is therefore sampled synchronously to the sampling of the microphone signal in the first hearing prosthesis. Thus, a binaural beamforming algorithm, or other types of binaural processing algorithms, executed in the binaural hearing system are capable of correctly determine directions to acoustic sources by examining inter-device differences between the digital input signals, such as phase or group delay differences.

Frequencies of the synchronous coding and data rate clock signals may be selected to about 9600 kHz and 600 kHz, respectively. The coding clock signal is used to clock the first sequence generator and the data rate clock signal is preferably used to control a timing of the first data signal in order to synchronise the repetitive coding sequence to the first data signal. The first sampling clock signal is finally also derived synchronously to the coding clock signal (and therefore to the data rate clock signal) to allow the first or master clock generator to control the timing of the sampling of the first input signal. The sampling clock signal and the data rate clock signal may be derived from the coding clock signal by well-known clock division and/or multiplication methodologies e.g. using D-Flip-Flops, PLLs, etc.

The first and second analogue-to-digital converters are preferably both of an oversampled sigma-delta type with a sampling frequency of about 1 MHz, thus making it possible to avoid analogue lowpass filters to bandwidth limit the first and second input signals provided by the respective microphones before sampling. The first and second digital input signals may be represented by respective non-decimated, e.g. single bit format signals, or by corresponding decimated signals having a sampling rate in or close to the audio-frequeny range, e.g. about 16 kHz with a resolution of 1–20 bits such as 16 bits.

The first and second data signals, provided by the respective data generating means, may be constituted by the first and second digital input signals, respectively, so that substantially unprocessed or "raw" time discrete microphone input signals are transmitted to the other hearing prosthesis. In this situation, the data rate of each of the first and second data signals, during transmission, may be selected to about 512 Kbit/s. Such a data rate corresponds to representing each of the first and second data signals with a sequence of 16 bits samples at a sample rate of 16 kHz during bi-directional communication in a time-multiplexed mode with a transmission duty cycle of 50%.

Alternatively, the first and/or second data signal(s) may be pre-processed digital signals which has or have been derived by their respective data generating means that, for the purpose of processing the data signals, may comprise one or more DSPs. This pre-processing may modify audio characteristics of the digital input signals such, e.g. filtering and/or compressing one or several frequency bands of the respective data signals.

Preferably, the data generating means are adapted to encode their respective data signals prior to transmission in accordance with a predetermined error detection and/or correction scheme. The encoding allows data errors, typically caused by electromagnetic interference from other RF-sources, introduced into the data signals during transmission to be detected and/or corrected. The encoding may also be adapted to reduce the data rates of the data signals and/or to remove a DC content of the data signals. A large number of suitable encoding schemes has been disclosed in the relevant literature and will as such be well known to the skilled person. Accordingly, this issue will not be discussed further here. Finally, encoding of the first and/or second data signal may implemented by inserting control data in one or both of the data signals in order to communicate control data from the first to the second hearing prosthesis and/or vice versa. The control data may be utilised to support e.g. co-ordination in operation mode between the first and second prostheses, e.g. co-ordinate automatic or user controlled switching between a number of pre-set listening programs and/or between different audio input sources such microphone input, dual-microphone input, telecoil input, direct audio input etc.

The first and second sequence generators are preferably both adapted to generate respective versions of an identical pseudorandom noise (PN) sequence. The two PN sequences will be phase-aligned, and synchronous to the coding clock signal, when the second clock retrieval and generating means have locked onto the first modulated data signal. Sequence generators for generating PN sequences are particularly well suited for implementation in digital circuits where a number of low-power and die-area efficient implementations are possible. The modulation of the first and second data signals with their respective repetitive coding sequences can furthermore be implemented by simple sign encoding or modulation e.g. by switching the data signals to +1/−1 volt. Sign modulation is particularly convenient to implement in CMOS technology since CMOS transistors are relatively good switch elements. By applying the above-mentioned modulation scheme, the resulting modulation of the digital signals is commonly referred to as direct sequence spread spectrum modulation (DS-SS). Alternatively, the first and second sequence generators may be adapted to control respective frequency synthesisers controllable to transmit signals on anyone of a plurality of carrier frequencies. Values of the PN sequence is utilised to randomly select a particular carrier frequency of the plurality of carrier frequencies and thus modulate the data signal. Thereby, the repetitive coding sequences will comprise a carrier signal that hops between different carrier frequencies in a pseudorandom manner. This latter modulation scheme is commonly referred to as frequency hopped spread spectrum modulation (FH-SS).

In order to process the first and second input signals with advanced binaural signal processing algorithms, one of the first or second hearing prosthesis or both of them may comprise a Digital Signal Processor. Accordingly, the binaural hearing system may operate in either a symmetric or in an asymmetric mode. In the asymmetric mode, the data generating means of the first hearing prosthesis comprise a Digital Signal Processor(DSP) adapted to process the first digital input signal and the second data signal in accordance with a predetermined signal processing algorithm to provide the first processed data signal or vice versa if the DSP is located in the second hearing prosthesis. In this asymmetric mode, the DSP is preferably adapted to also generate a first or second data signal that has been binaurally processed and which therefore may be passed directly to the output means on the reverse side hearing prosthesis. Thereby, the asymmetric binaural hearing system may operate with a single DSP that processes the digital input signals from both hearing prostheses and generate binaurally processed data signals for both aids. Naturally, such an asymmetric binaural hearing system may contain DSPs in both hearing prostheses so that the asymmetric operation is obtained by programming one of the devices as a master device during the initial fitting of the binaural hearing system. The master device, in this situation, is programmed to execute the predetermined signal processing algorithm to generate and provide respective binaurally processed signals for both hearing prostheses. An advantageous property of this latter embodiment of the invention is that the hearing prostheses in a binaural pair can be identical units which may simplify the distribution and repair handling procedures.

In the symmetric operating mode, the data generating means of the first hearing prosthesis comprise a first Digital Signal Processor adapted to process the first digital input signal and the second data signal in accordance with a predetermined first signal processing algorithm to provide the first processed data signal to the first output means. The data generating means of the second hearing prosthesis comprise a second Digital Signal Processor adapted to process the second digital input signal and the first data signal in accordance with a predetermined second signal processing algorithm to provide the second processed data signal to the second output means.

According to a preferred embodiment of the invention, the first Digital Signal Processor and the first output means operate synchronously to the coding clock signal, and the second Digital Signal Processor and the second output means operate synchronously to the retrieved clock signal. Thereby, the acoustical or electrical output signals of the respective hearing prostheses are synchronised in time so as to provide a hearing system capable of delivering phase aligned acoustic or electrical output signals to the user's eardrums. All clock signals within the second hearing prosthesis are preferably locked to the retrieved clock signal (and thereby to the coding clock signal) while all clock signals within the first hearing prosthesis are synchronised to the coding clock signal. This embodiment of the invention provides a simple and efficient method of synchronising all clock signals within the entire binaural hearing system, i.e. also across the wireless communication channel. Such a completely synchronised hearing system supports binaural processing algorithms that are capable of retaining naturally occurring binaural signal cues, such as interaural phase and level differences, in the acoustic or electrical output signals provided to the user.

For some applications of the present binaural hearing system, it may be advantageous to make the second hearing prosthesis capable of operating as a stand-alone device, independently of whether or not the first hearing prosthesis transmits the first modulated data signal. This has been accomplished by a binaural hearing system wherein the second hearing prosthesis comprises a second clock oscillator adapted to generate a second coding clock signal and the second sampling clock signal. The second hearing prosthesis further comprises clock mode selection means operatively connected to the second clock and data retrieval means and the second clock oscillator and adapted to selectively use the second clock and data retrieval means or the second clock oscillator as a source for clock signals in the second hearing prosthesis. Thereby, a mono-aural operation mode is supported by both hearing prostheses during time periods with interruptions in the first modulated data signal.

According to this embodiment of the invention, the second hearing prosthesis is adapted to automatically operate in mono-aural mode if the clock mode selection means detect that the first modulated data signal and/or the first data signal is/are absent or contain(s) too many errors to be used.

Since it may be impractical to sell and distribute binaural hearing systems where only one of the pair of hearing prostheses is capable of operating as a master device during bi-directional communication, a preferred embodiment of the invention is one wherein the first hearing prosthesis further comprises first clock and data retrieval means allowing the prosthesis to lock onto the second modulated data signal to synchronise clock signals of the first prosthesis to the second clock oscillator. In such a binaural hearing system, operation as a master device is supported for both the first and the second hearing prosthesis. In a particularly preferred embodiment of the invention, the selection of which of the hearing prostheses that should operate as the master(and the other as a slave device) during binaural operation can be selected during the initial fitting session by programming the devices from a fitting system. Each of the hearing prostheses comprises a programming interface for exchanging programming data between a host programming system and the hearing prosthesis, and a configuration register programmable through the programming interface and operatively connected to the clock mode selection means to control their operation.

According to yet another embodiment of the invention, the first and second modulated data signals are transmitted by their respective wireless transceivers without having any further RF modulation applied than the modulation provided by the repetitive coding sequence. This embodiment of the invention has as a particularly attractive feature that commonly employed RF modulators and demodulators can be dispensed with to minimise current and area consumption and reduce design complexity of the first and second wireless transceivers.

However, for other applications it may be more effective, in particular in terms of minimising power consumption, to include within the first wireless transceiver a first RF modulator adapted to further modulate the first modulated data signal to generate and transmit a first RF modulated data signal to the second hearing prosthesis and a first RF demodulator adapted to recover the second modulated data signal from a second RF modulated data signal. The second wireless transceiver further comprises a second RF modulator adapted to further modulate the second modulated data signal to generate and transmit the second RF modulated data signal to the first hearing prosthesis and a second RF demodulator adapted to recover the first modulated data signal from the first RF modulated data signal from the first wireless transceiver. This embodiment may be more power efficient than the direct transmission of the first and second modulated data signals since a carrier frequency of the RF modulators may be selected so as to provide an optimum match to a particular type of transmission/reception antennas. Accordingly, in the present specification and claims the term "modulated data signal" may designate a data or digital signal which solely has been modulated with the coding sequence prior to transmission. Or the term may designate a data signal that has been modulated with the coding sequence to form a composite signal and thereafter further modulated or up-converted with a RF carrier signal so as to provide e.g. a FSK modulated RF composite signal.

The first and second wireless transceivers must comprise some form of antenna means to transmit/receive the modulated data signals. For hearing aid applications, it may be difficult to provide sufficient housing space for an effective RF antenna. This is particularly true if it is desired to transmit the modulated data signals in the RF range below about 1 GHz due to relatively large wavelengths, in comparison to typical dimensions of hearing aids, of such RF signals.

According to an embodiment of the invention, each of the first and second wireless transceivers comprises an inductive coil where the inductive coils are adapted to transmit and receive the modulated data signals, or the RF modulated data signals, by utilising near-field magnetic coupling between said inductive coils. Each of the inductive coils may be tuned to a target transmission frequency by arranging a suitable tuning capacitor across the coil so as to provide a Q for each of the inductive antennas of about 4, preferably between 3 and 10 to optimise the received/transmitted power at the antennas. The communication frequency is preferably selected to a frequency somewhere between 50–100 MHz for such a magnetically coupled system.

The above-described binaural hearing system is adapted to communicate bi-directional data signals to support binaural signal processing algorithms and thereby allow the hearing system to restore or enhance binaural signal cues in the acoustic input signals.

However, it may also be advantageous to provide a hearing aid system where spread spectrum techniques are employed for the purpose of synchronising the signal processing between the hearing aids to secure e.g. identical sampling frequencies between the aids. A signal delay or group delay through a DSP based hearing prostheses is commonly dominated by a group delay associated with the digital processing of the input signal. This group delay is furthermore substantially proportional to the inverse of each individual hearing prosthesis' own master clock frequency. Since a common tolerance on the latter value is about +/−5–10%, the group delay difference between two randomly selected hearing prostheses may be quite large. Consider a case where a particular hearing prosthesis has a nominal group delay value of 5 ms. Individual prostheses of the same type may exhibit a group delay anywhere from 4.5 ms to 5.5 ms. The group delay difference between these values is more than the maximum interaural time delay of 600–700 μS that occurs in natural, i.e. unaided, human hearing. By providing matching of the signal delays through the hearing prostheses, binaural signal cues in the input acoustic signals can better be preserved.

A second aspect of the invention therefore relates to a wireless synchronised hearing aid system comprising a first and a second hearing prosthesis wherein the first hearing prosthesis comprises:

a first microphone adapted to generate a first input signal in response to receiving acoustic signals and a first analogue-to-digital converter adapted to sample the first input signal by a first sampling clock signal to generate a first digital input signal, a first clock generator adapted to generate a coding clock signal and a first sampling clock signal synchronously with respect to each other, a first sequence generator adapted to generate a repetitive coding sequence synchronously to the coding clock signal, a first wireless transmitter adapted to transmit a synchronisation signal based on the repetitive coding sequence to a second wireless receiver of the second hearing prosthesis, a first Digital Signal Processor and first output means, operated synchronously to the the coding clock signal, and adapted to process the second digital input signal in accordance with a predetermined second signal processing algorithm to provide a first acoustical output signal; and the second hearing prosthesis comprises: a second microphone adapted to generate a second input signal in response to receiving acoustic signals, a second analogue-to-digital converter adapted to sample the second input signal by a second sampling clock signal to generate a second digital input signal, a second sequence generator adapted to generate a version of the repetitive coding sequence of the first sequence generator synchronously to a retrieved clock signal, the second wireless receiver being adapted to receive the synchronisation signal and retrieve the repetitive coding sequence, second clock retrieval means adapted to lock onto the synchronisation signal to retrieve to generate the retrieved clock signal and the second sampling clock signal, synchronously to the first coding clock signal, by correlating said synchronisation signal with the version of the repetitive coding sequence, a second Digital Signal Processor and second output means, operated synchronously to the retrieved clock signal, and adapted to process the second digital input signal in accordance with a predetermined second signal processing algorithm to provide a second acoustical output signal; Thereby, the hearing prostheses are operated in a time-synchronised manner so as to provide a DSP based hearing aid system which supports matched signal delays through the hearing prostheses.

According to this second aspect of the invention, spread spectrum technology is employed to synchronise the signal processing of the hearing prostheses by the transmitted synchronisation signal and based on the repetitive coding sequence. By not transmitting bi-directional data signals during operation, power consumption within the wireless transceivers may be significantly reduced in both hearing aids.

The first DSP may, furthermore, be adapted to generate a digital control data signal for controlling an operation mode of the second hearing prosthesis and the first wireless transmitter may be adapted to modulate the digital control data with the repetitive coding sequence and use the digital control data as the synchronisation signal. The control data are thus modulated with the repetitive coding sequence and transmitted to the second hearing prosthesis where they are retrieved in a manner corresponding to the retrieval of the first and second data signals described in connection with the first aspect of the invention.

The repetitive coding sequence provided by the first and second sequence generators of the binaural hearing system or by the sequence generators of the synchronised hearing aid system may comprise, or be constituted by, a pseudorandom noise (PN) sequence. Alternatively, each sequence generator may be adapted to select a carrier frequency provided by a frequency synthesiser based on values of a pseudorandom noise (PN) sequence to generate a frequency-hopped repetitive coding sequence.

DETAILED DESCRIPTION OF A PREFERRED EMBODIMENT

In the following, a specific embodiment of a DSP based hearing aid system according to the invention is described and discussed in greater detail. The present description discusses in detail only a wireless DS-SS bi-directional communication system and its utilisation to synchronise corresponding clock signals between two individual hearing aids of the system.

To support low power and low voltage operation of the present wireless DS-SS communication system and associated DSPs, logic gates and other digital circuits are preferably implemented in a low threshold voltage CMOS process. Preferred processes are 0.5–0.18 μm CMOS processes with threshold voltages located in the range from about 0.5 to 0.8 Volt.

Figure 1:
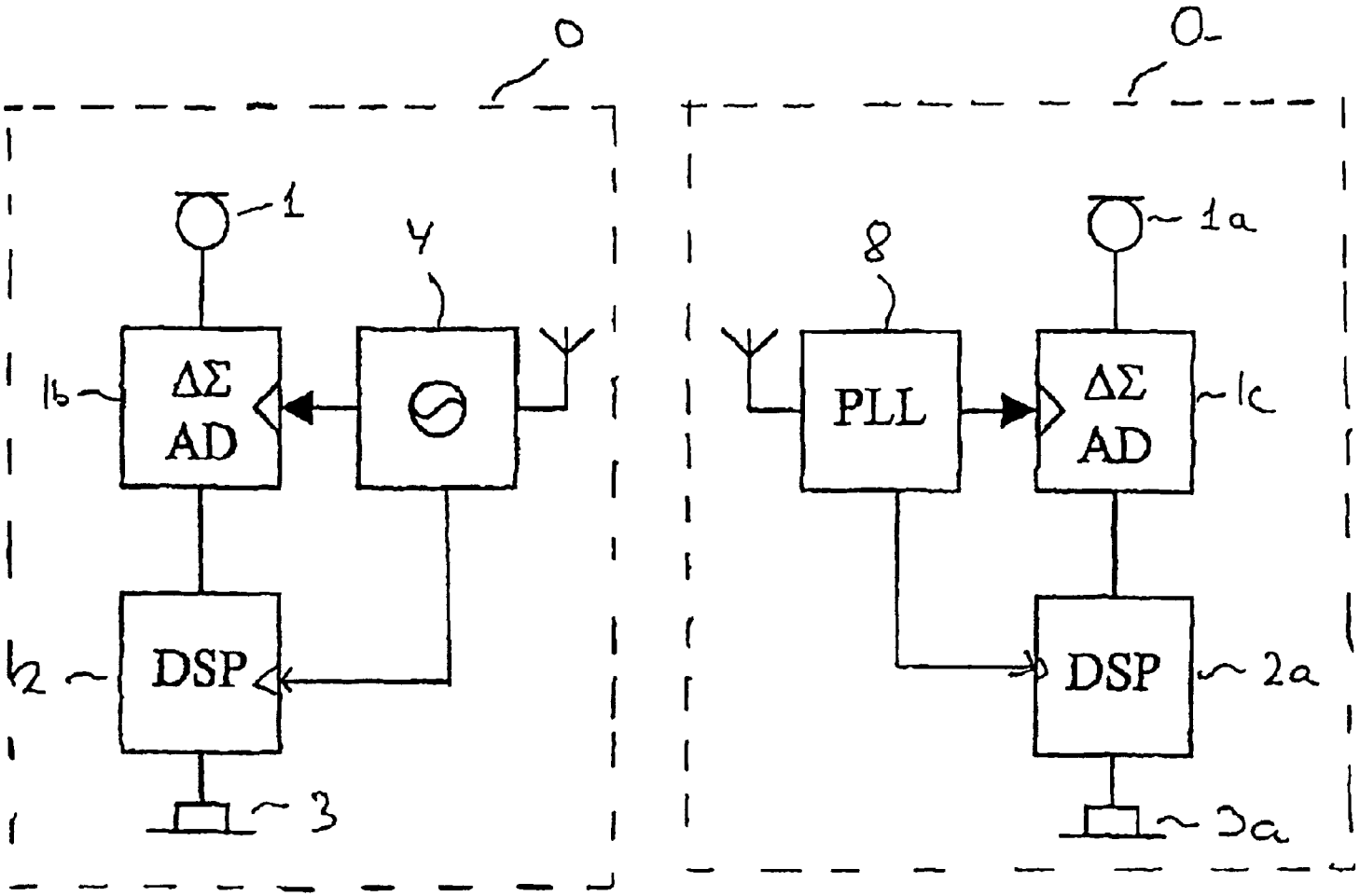
FIG. 1 is a simplified block diagram of a binaural hearing aid system according to the invention.

In the overall system diagram of the binaural hearing aid system shown on FIG. 1, a first or master hearing aid 0 and a second, or slave hearing aid 0_, are communicating bi-directional data signals in a time-multiplexed mode. Each hearing aid comprises an associated programmable DSP 2, 2a which processes respective input signals provided by oversampled analogue-to-digital converters 1b, 1c. Receivers 3, 3a convert their respective processed data signals to respective acoustic signals perceivable for the hearing aid user. A circuit block 4 comprises a master oscillator that generates a sampling clock signal for the analogue-to-digital converters 1b and a clock signal for the DSP 2. The second hearing aid 0_ receives a digital data signal modulated by DS-SS spectrum method, further explained in connection with FIG. 2, and retrieves by a phase-locked or delay-locked loop 8 a synchronous clock signal from a received first data signal transmitted by the master hearing aid 0. The first data signal has been modulated by a synchronous predetermined repetitive pseudorandom noise sequence. The retrieved synchronous clock signal is utilised to derive a sampling clock signal for the analogue-to-digital converter 1c and a DSP clock signal for the DSP 2a. Accordingly, clock signals for the oversampled analogue-to-digital converters 1b, 1c and the DSP 2, 2a are locked to each other to allow these devices to be operated synchronously.

Figure 2:
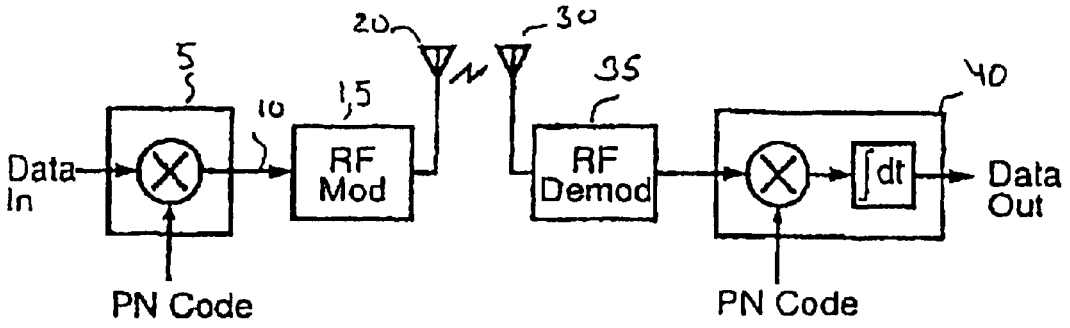
FIG. 2 shows a simplified block diagram of an integrated DS-SS transceiver system for a hearing aid system according to the invention.

In the simplified block diagram of FIG. 2, the transceiver of the first, or master, hearing aid is illustrated only in its transmission mode and the transceiver of the second, or slave, hearing aid is illustrated only in its reception mode. However, it should be understood that in the preferred embodiment of the invention, both transceivers of the present binaural hearing aid system comprises a transmitting part and a receiving part so that each transceiver alternates between transmitting the digital data signal to the other side and receiving the digital data signal from the other side in a full duplex time-multiplexed scheme. The number of symbols or data bits of the digital input signals that it is practical to transmit/receive in one "burst" will vary depending on specific requirements to the binaural hearing aid system in question. To keep audio delay time low through the individual hearing aids of the system, it is preferred that 1–32 audio samples, or 16–512 symbols for an unencoded digital input signal of 16 bit samples, such as about 16 audio samples are transmitted/received from/in each transceiver during one "burst". If the sampling rate (or decimated rate if an oversampling analogue-to-digital converter is utilised) of a microphone input signal is designed to about 16 kHz, a delay of 32 samples will correspond to a delay time of 2 ms, a value which is added to an inevitable inherent signal delay time through each of the hearing aids of the system.

In FIG. 2, the first data signal is supplied at a terminal, Data In, from a DSP(not shwon) of the master hearing aid to a code modulator 5 that modulates data bits or symbols of the first data signal by respective consecutive 16 bit code sequences taken out of a predetermined repetitive pseudorandom noise sequence or PN sequence. Thereby, a first modulated data signal of the first hearing aid is formed on signal line 10 with a bit rate 16 times higher the original rate, i.e. the bit rate of the first data signal, and a correspondingly broader spectral bandwidth. The raised data rate of the first modulated data signal on signal line 10 is by convention referred to as the "chipped-rate". The first modulated data signal is further modulated up in frequency by an Radio Frequency (RF) modulator 15 before a composite RF signal is transmitted to the second hearing prosthesis over antenna 20. The frequency of the carrier of the RF modulator 15 is preferably selected in the range 200 MHz–1 GHz. The length of PN sequence is preferably about $2^{16}$–1 and each pair of hearing aids in the binaural hearing aid system is provided with its own unique PN sequence which is substantially orthogonal to all other codes that may be used in other hearing aid systems of the same type. Thereby, interference between closely spaced hearing aid systems can be avoided because only hearing aids that belong to the same pair are able to acquire mutual lock and communicate the digital signals.

In the second hearing prosthesis, a second antenna 30 receives the composite RF signal transmitted by the first hearing aid. A RF demodulator 35 downconverts the received composite RF signal to a baseband frequency range and extracts the first modulated data signal. Thereafter, a clock and data retrieval and generating circuit 40 multiplies the first modulated data signal with an synchronous version of that PN code that was used to encode the first data signal in the first hearing aid.

Since the product of two versions of a predetermined repetitive pseudorandom noise sequence or PN sequence is one only if the two versions are exactly in phase, the clock and data retrieval and generating circuit 40, within the second hearing aid, is able to acquire and maintain lock to the transmitter by continuously evaluating an autocorrelation function between the two versions of the PN code and adjust a relative phase between the PN sequences to obtain a maximum correlation value. This issue will be addressed further in connection with the description of FIGS. 3 and 4. Finally, at an output terminal, Data Out, of the clock and data retrieval and generating circuit 40, an retrieved and synchronous version of the first data signal and a retrieved synchronous clock signal (not shown) has been obtained. The retrieved synchronous clock signal is subsequently used to further derive appropriate synchronous clock signals for various parts of the signal sampling and processing circuits of the second hearing aid. Of particular importance in this connection is the generation of a synchronous sampling clock signal (xx FIG. 1) that controls the sampling of the second aid's microphone input signal so as to be synchronous with respect to the corresponding sampling of the microphone input signal of the first hearing aid.

In an alternative embodiment of the above-described integrated DS-SS transceiver system, the (traditional) RF modulator 15 and demodulator 35 circuits have been designed to operate at communication frequency which is very low compared to typical RF communication frequencies, e.g. lower than the above-mentioned 200 MHz–1 GHz RF communication frequency range. Such a low RF carrier frequency may be as low as only about 4–8 times higher than the chipped-rate of the modulated data signals, to further save power and reduce complexity of the transceivers. RF antennas 20 and 30 has also been replaced by respective inductive coils adapted to communicate the first and second data signals between the first and second hearing aids by utilising near-field magnetic coupling between the inductive coils. The requirement to transmission distance of a binaural hearing aid system is in the order of 15–25 cm. The above-described wireless magnetic coupling technique is practical because of the short transmission distance. Furthermore, magnetically coupled system, has as another attractive, a limited far-field emission of electro-magnetic signals compared to the emission of traditional far-field coupled system which are obtained at higher communication frequencies and communicated over antennas designed to operate at such higher communication frequencies.

Consequently, instead of using traditional antennas, it may prove more power efficient to transfer the digital data signals for hearings aid applications, and other very short-range applications, by way of magnetic induction. Crucial issues are that the distance between the hearing aids is not much larger than physical dimensions of the coils, and that the physical dimensions of the coils are very small (at least about 10 times smaller) compared to the wavelength of the RF carrier. Under such conditions, the transmitter power required to transmit a desired bandwidth and at a sufficiently low bit error rate (BER) may be transferred by near-field magnetic coupling, or mutual induction, while at the same time minimising far-field coupling. Minimising the far-field coupling helps improving the interference immunity and compliance to EMC regulations in general.

The first and second data signals may be coded versions of digital audio signals processed within the respective hearing aids, such as coded versions of the first and second digital input signals obtained from the respective microphone signals. The first and second data signals may also be constituted by digital signals that has been processed by the DSPs or the first and second data signals may represent unencoded digital input signals. The coding may be provided to support error detection and/or correction of the received digital signals according to a number of methods well known in the art, e.g. Reed Solomon coding. Encoding may further be applied for the purpose of removing any DC content of the digital signals prior to their transmission in order to simply the design of the receiving part of the transceivers. Finally, the coding of the digital data signals may comprise the step of inserting control data or information into the first and/or second data signal(s) and extract these control data at the receiving side to communicate control information between the hearing aids.

The transmission frequency for the present near-field magnetically coupled communication system is preferably selected in the range 50–100 MHz and each inductive coil may have a inductance of between 200 nH and 2 μH. The data or symbol rate of each of the first and second data signals is preferably about 600 Kbit/s in order to support an audio rate of about 256 Kbit/s of each of the first and second data signals in combination with an effective transmission duty cycle of about 50% plus overhead data for a forward error correction scheme. Accordingly, if these 600 Kbit/s first and second data signals are modulated with 16 codes of the PN code sequence per data bit, the resulting chip rate of each of the modulated data signals will be about 9600 Kbit/s. If an even higher transmission frequency is desired, further RF modulation or up-conversion may be applied to the "chipped" modulated data signal in order to further raise its transmission frequency to a desired, or target, range, as explained above. For the near-field magnetic coupled communication system, the further RF carrier frequency is preferably selected to be only about 4–8 times higher than the chipped rate of the modulated data signals. An important advantage of operating the integrated DS-SS transceiver system by near-field magnetic coupling is that it may be possible to reduce the required transmission power to a level that is below RF spurious emission requirements according to national and/or international EMC norms. These spurious emission requirements are in practice measured in the far-field of the device under consideration.

However, a near-field magnetic coupled communication system is capable of coupling more of the transmitter's emitted electromagnetic power to the receiving antenna than a corresponding traditional RF based communication system is capable of for any fixed level of far-field electromagnetic power. Consequently, for the purpose of suppressing RF spurious emission power from the transceivers, as measured in the far-field, the near-filed magnetic coupled system has superior characteristics.

According to the European EMC norm EN55022 all radio transmitting devices must have an emitted spurious power density of less than −54 dBm in most of the frequency range below 230 MHz and below −54 dBm from 230 MHz–1 GHz. Consequently, if the emitted power density of the integrated DS-SS transceiver system is kept below −54 dBm everywhere in the 0 Hz–1 GHz transmission frequency band, the transceiver system will be able to meet these requirements.

Figure 3:
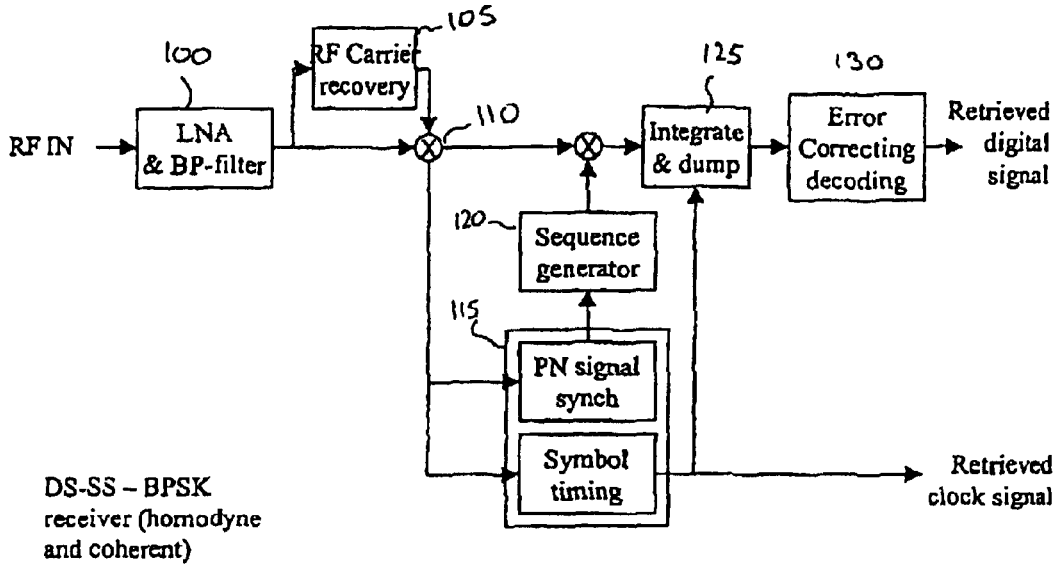
FIG. 3 is a more detailed block diagram of a receiver and a clock extraction and generating part of the DS-SS transceiver system shown in FIG. 2.

In FIG. 3, the composite RF signal is amplified and band-pass filtered by RF input circuit 100. A RF carrier recovery circuit 105 extracts a RF carrier from the composite RF signal, and the RF carrier is subsequently mixed or multiplied with the composite RF signal by downconverter 110. The modulated data signal, constituted by the digital signal modulated at the chip-rate, has now been recovered at an output of the downconverter 110. Thereafter, the modulated data signal is applied to a PN signal synch and symbol timing circuit 115 that generates the retrieved synchronous clock signal that defines the symbol rate of the digital signal and a retrieved synchronous "chipped" clock signal. The retrieved synchronous clock signal is accordingly used to control an integration time period of integrator 125 and an integrator output signal is applied to a decision device that converts the result of the integration to a corresponding bit value, e.g. +1 or −1. Error correction circuit 130 detect/correct any errors in the output signal of the decisions device and thereby provides the retrieved synchronous digital signal at its output. The retrieved synchronous "chipped" clock signal is used by a PN signal synch circuit to control a timing of a local PN sequence generator 120 which generates the specific PN sequence utilised by the pair of hearing aids in question.

Figure 4:
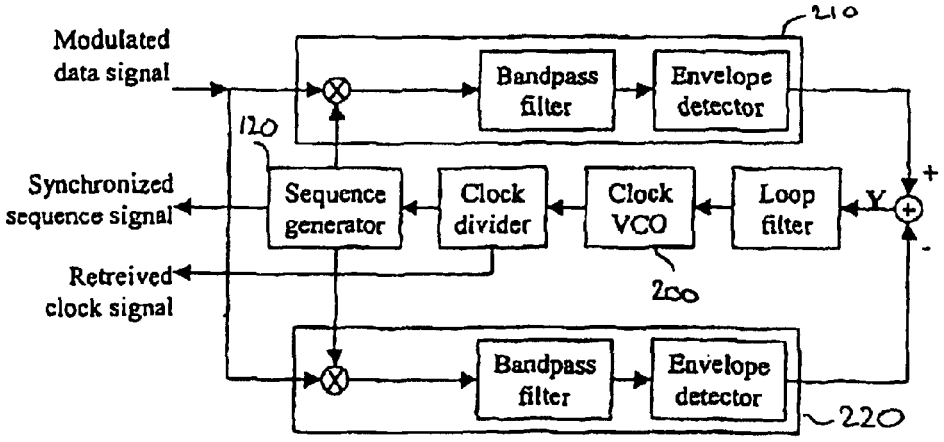
FIG. 4 is a block diagram that shows in more detail a circuit for generating a synchronised coding sequence.

FIG. 4 shows a delay-locked loop that has been designed to implement the PN signal synch and Symbol timing circuit (115, FIG. 3). The local PN generator 120 and two time-shifted versions of the synchronized PN signal are used to generate early and late controls signal so as to adjust the phase of the synchronised sequnce signal to obtain maximum correlation between the local PN generator's signal and the retrieved modulated data signal. The time shifts are plus and minus $T_c/2$ respectively.

Figure 5:
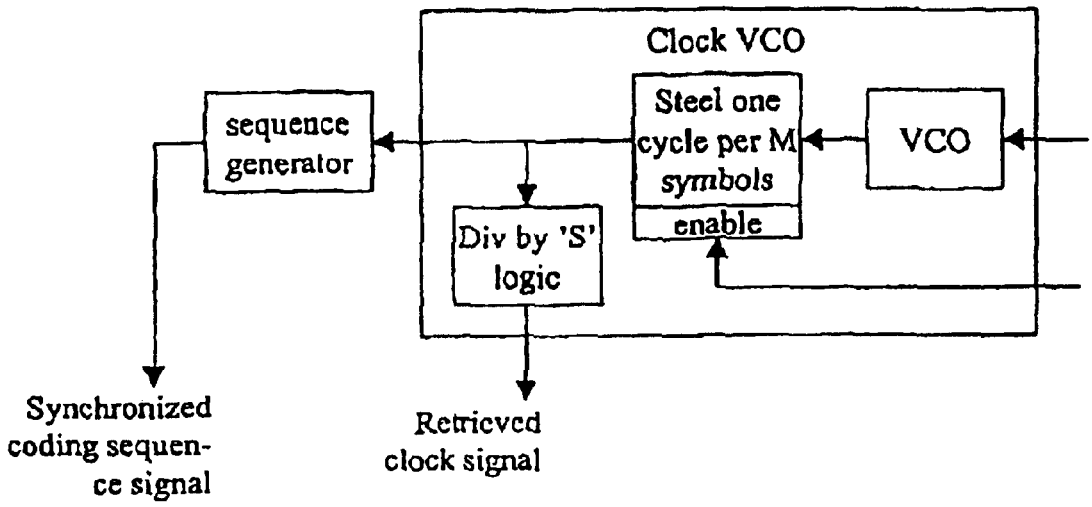
FIG. 5 is a block diagram showing in more detail the clock VCO circuit of FIG. 4.

FIG. 5 shows in more detail a block diagram of the preferred clock VCO (200, FIG. 4) to illustrate a preferred acquisition method that uses a so-called sliding correlator. If the integrator (125, FIG. 3) output falls below a certain threshold for M consecutive symbols, the sliding correlator drops one clock cycle to the local PN sequence generator (120, FIG. 3). This will offset the sequence generated by the local PN generator one cycle. The PN signal is cyclic with a period of L, that may be selected between $2^8-1$ and $2^{16}-1$, and cycle to cycle alignment to the transmitter's PN sequence will occur after up to L cycle steels.

What is claimed is:

1. A binaural hearing system comprising a first and a second hearing prosthesis adapted for wireless bi-directional communication of digital data signals; the first hearing prosthesis comprises:

a first microphone adapted to generate a first input signal in response to receiving acoustic signals, a first analogue-to-digital converter adapted to sample the first input signal by a first sampling clock signal to generate a first digital input signal, a first clock generator adapted to generate a coding clock signal, a data rate clock signal and the first sampling clock signal synchronously with respect to each other, a first sequence generator adapted to generate a repetitive coding sequence synchronously to the coding clock signal, first data generating means adapted to provide a first data signal synchronously to the data rate clock signal, a first wireless transceiver adapted to receive and modulate the first data signal with the repetitive coding sequence to transmit a first modulated data signal to a second wireless transceiver of the second hearing prosthesis and to retrieve a second data signal from a second modulated data signal received from the second wireless transceiver, first output means adapted to convert a first processed data signal to a first acoustical or electrical output signal; and the second hearing prosthesis comprises:

a second microphone adapted to generate a second input signal in response to receiving acoustic signals, a second analogue-to-digital converter adapted to sample the second input signal by a second sampling clock signal to generate a second digital input signal, a second sequence generator adapted to generate a version of the repetitive coding sequence of the first sequence generator synchronously to a second coding clock signal, second data generating means adapted to provide a second data signal synchronously to a retrieved clock signal, a second wireless transceiver adapted to receive the first modulated data signal from the first wireless transceiver and to modulate the second data signal with the version of the repetitive coding sequence to transmit a second modulated data signal to the first wireless transceiver, second clock and data retrieval means adapted to lock onto the first modulated data signal to retrieve the first data signal and to generate the second sampling clock signal and the retrieved clock signal, synchronously to the first coding clock signal, by correlating said first modulated data signal with the version of the repetitive coding sequence, second output means adapted to convert a second processed data signal to a first acoustical or electrical output signal;

whereby the respective sampling clock signals of the hearing prostheses are synchronised in time so as to provide a hearing system with synchronous sampling of the respective microphone input signals.

2. A binaural hearing system according to claim 1, wherein the data generating means of the first hearing prosthesis comprises a Digital Signal Processor adapted to process the first digital input signal and the second data signal in accordance with a predetermined signal processing algorithm to provide the first processed data signal; or the data generating means of the second hearing prosthesis comprises a Digital Signal Processor adapted to process the first data signal the second digital input signal in accordance with a predetermined signal processing algorithm to provide the second processed data signal.

3. A binaural hearing system according to claim 1, wherein the data generating means of the first hearing prosthesis comprise:

a first Digital Signal Processor adapted to process the first digital input signal and the second data signal in accordance with a predetermined first signal processing algorithm to provide the first processed data signal to the first output means, and the data generating means of the second hearing prosthesis comprise:

a second Digital Signal Processor adapted to process the second digital input signal and the first data signal in accordance with a predetermined second signal processing algorithm to provide the second processed data signal to the second output means.

4. A binaural hearing system according to claim 3, wherein the first Digital Signal Processor and the first output means operate synchronously to the coding clock signal, and the second Digital Signal Processor and the second output means operate synchronously to the retrieved clock signal;

whereby the acoustical or electrical output signals of the respective hearing prostheses may be synchronised in time so as to provide a hearing system capable of delivering phase-aligned acoustic or electrical output signals to a user.

5. A binaural hearing system according to any of the preceding claims, wherein the second hearing prosthesis further comprise:

a second clock oscillator adapted to generate a second coding clock signal and the second sampling clock signal, clock mode selection means operatively connected to the second clock and data retrieval means and the second clock oscillator and adapted to selectively use the second clock and data retrieval means or the second clock oscillator as a source for clock signals in the second hearing prosthesis;

thereby supporting a mono-aural operation mode in each prosthesis during time periods with interruptions in the first modulated data signal.

6. A binaural hearing system according to claim 5, wherein the first hearing prosthesis further comprises first clock and data retrieval means allowing the prosthesis to lock onto the second modulated data signal to synchronise clock signals of the first prosthesis to the second clock oscillator;

thereby providing a binaural hearing system that allows the first or the second hearing prosthesis to operate as a master device and the other as a slave device during binaural operation.

7. A binaural hearing system according to claim 6, wherein each of the hearing prostheses comprise:

a programming interface for exchanging programming data between a host programming system and the hearing prosthesis, and a configuration register programmable through the programming interface and operatively connected to the clock mode selection means to control their operation;

thereby supporting fitting session configurable system.

8. A binaural hearing system according to claim 1, wherein the first wireless transceiver further comprises: a first RF modulator adapted to further modulate the first modulated data signal to generate and transmit a first RF modulated data signal to the second hearing prosthesis and a first RF demodulator adapted to recover the second modulated data signal from a second RF modulated data signal, and wherein the second wireless transceiver further comprises a second RF modulator adapted to further modulate the second modulated data signal to generate and transmit the second RF modulated data signal to the first hearing prosthesis and a second RF demodulator adapted to recover the first modulated data signal from the first RF modulated data signal from the first wireless transceiver.

9. A binaural hearing system according to claim 1, wherein each of the first and second wireless transceivers comprises an inductive coil, the inductive coils being adapted transmit and receive the modulated data signals or the RF modulated data signals by utilising near-field magnetic coupling between said inductive coils.

10. A wireless synchronised hearing aid system comprising a first and a second hearing prosthesis, wherein the first hearing prosthesis comprises:

a first microphone adapted to generate a first input signal in response to receiving acoustic signals, a first analogue-to-digital converter adapted to sample the first input signal by a first sampling clock signal to generate a first digital input signal, a first clock generator adapted to generate a coding clock signal and a first sampling clock signal synchronously with respect to each other, a first sequence generator adapted to generate a repetitive coding sequence synchronously to the coding clock signal, a first wireless transmitter adapted to transmit a synchronisation signal based on the repetitive coding sequence to a second wireless receiver of the second hearing prosthesis, a first Digital Signal Processor and first output means, operated synchronously to the the coding clock signal, and adapted to process the second digital input signal in accordance with a predetermined second signal processing algorithm to provide a first acoustical output signal; and the second hearing prosthesis comprises:

a second microphone adapted to generate a second input signal in response to receiving acoustic signals, a second analogue-to-digital converter adapted to sample the second input signal by a second sampling clock signal to generate a second digital input signal, a second sequence generator adapted to generate a version of the repetitive coding sequence of the first sequence generator synchronously to a retrieved clock signal, the second wireless receiver being adapted to receive the synchronisation signal and retrieve the repetitive coding sequence, second clock retrieval means adapted to lock onto the synchronisation signal to retrieve to generate the retrieved clock signal and the second sampling clock signal, synchronously to the first coding clock signal, by correlating said synchronisation signal with the version of the repetitive coding sequence, a second Digital Signal Processor and second output means, operated synchronously to the retrieved clock signal, and adapted to process the second digital input signal in accordance with a predetermined second signal processing algorithm to provide a second acoustical output signal;

whereby the hearing prostheses are operated in a time-synchronised manner so as to provide a DSP based hearing aid system with matched signal delay through the hearing prostheses.

11. A synchronised hearing system according to claim 10, wherein the first is adapted to generate digital control data for controlling an operation mode of the second hearing prosthesis, and the first wireless transmitter is adapted to modulate the digital control data with the repetitive coding sequence and use the digital control data as the synchronisation signal.

12. A synchronised hearing system according to any of claims 10–11, wherein the repetitive coding sequence of the first and second sequence generators comprises a pseudorandom noise (PN) sequence.

13. A synchronised hearing system according to any of claims 10–11, wherein the first sequence generator is adapted to select a carrier frequency of frequency synthesiser based on values of a pseudorandom noise (PN) sequence to generate a frequency-hopped repetitive coding sequence.

* * * * *